June 6, 1967 P. E. TOBIAS 3,323,415
OPTICAL PASTE-UP ALIGNER
Filed March 26, 1965
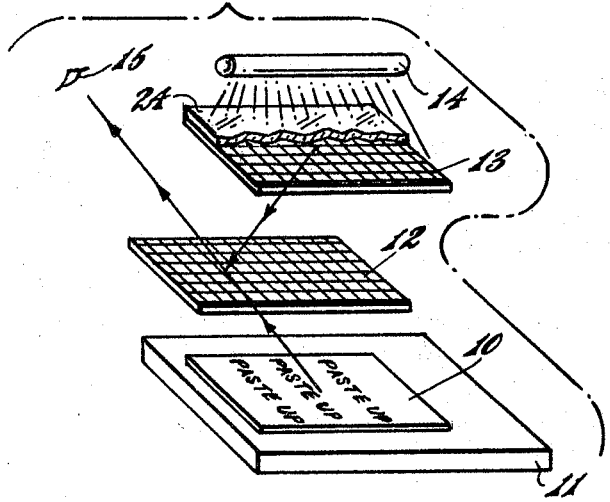
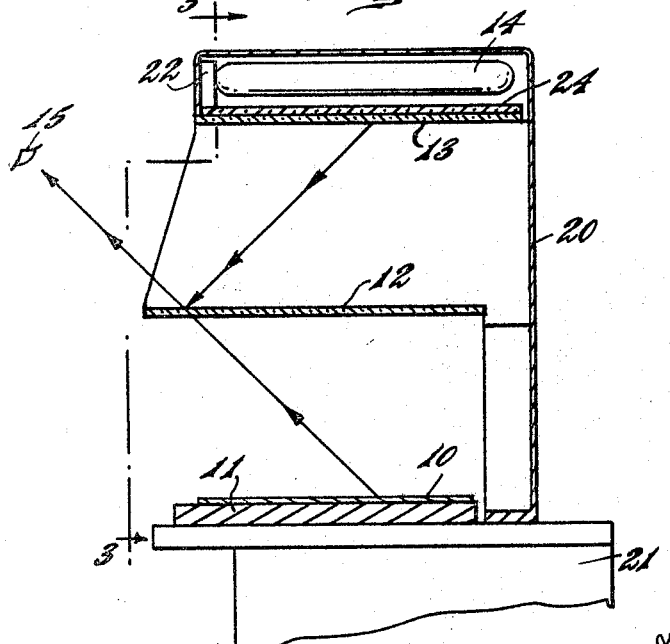
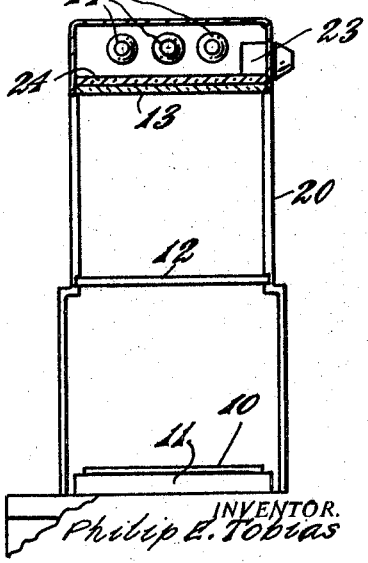
INVENTOR.
Philip E. Tobias
BY
ATTORNEYS

United States Patent Office 3,323,415
Patented June 6, 1967

3,323,415
OPTICAL PASTE-UP ALIGNER
Philip E. Tobias, Mt. Carmel and Houston Aves.,
Glenside, Pa. 19038
Filed Mar. 26, 1965, Ser. No. 442,961
4 Claims. (Cl. 88—24)

The present invention relates to an improved device for producing paste-up copy for use in a printing process and more particularly to a device which superimposes guide lines upon a base sheet to aid in a paste-up operation.

An object of this invention is to provide a paste-up aligner which will transmit a guide line image and superimpose the same upon the surface of a paste-up paper or base sheet so that an operator can easily and efficiently produce paste-up copy with all the individual pieces or elements in their proper relationship.

A further object of this invention is to provide a paste-up aligner having guide lines which will not become obscured by the application of paste-up pieces but which will always be available to properly position subsequent pieces on the paste-up sheet.

An additional object of this invention is to provide a paste-up aligner device which is inexpensive and simply constructed so that it can easily be operated and yet will be capable of producing a paste-up quicker, more accurately and with less fatigue than prior art devices.

The objects of this invention are accomplished by transmitting guide lines from a grid plate down on to a transparent reflective screen through which a paste-up sheet is observed. The guide lines reflected off the surface of the screen appear to an observer looking through the screen to be superimposed upon the paste-up sheet which is positioned below the screen. In this way an observer or operator can re-arrange the elements or pieces around on the surface of the sheet to obtain the proper relationship between them without ever interfering with the guide lines being superimposed from above.

The paste-up process for producing composite sheets consists essentially of taking proofs of type, printed or pictorial material, and adhering these to a base sheet. This sheet is then photographed with the individual elements in proper relationship to one another for subsequent use in a printing process.

In prior art devices, in order to obtain the proper squareness of the individual elements, it was customary to use a T-square, triangle and ruler or to use a preprinted base sheet with guide lines therein, illuminating the same with a light source from underneath the sheet. While this latter method is superior to the T-square from the standpoint of convenience and speed, it suffers from several disadvantages. A typical disadvantage is the diffusion of the image of the guide lines as it passes through the paste-up paper. Due to this light diffusion, it is essential that the elements be in contact with the base sheet before the grid lines are visible through the piece being pasted down. Since it was only important that the printing on these pieces be properly positioned, the edges of them could be shorter or non-parallel to the edges of the base sheet. However, the pieces could not overlap or interfere with the position of closely adjoining ones, because if the pieces began to pile up on one another at the edges the light diffusion became even greater until it was nearly impossible to see the grid or guide lines from above. In addition, if the pieces were provided with a pressure sensitive adhesive, moving them around once contact had been made was quite difficult. To add to the difficulty, the grid lines were generally printed on the base sheet in light blue ink so that subsequent photography using ortho-chromatic film would not record these lines. This also added to the difficulty of seeing the grid lines during paste-up.

These disadvantages are overcome in the present device by providing a system which utilizes a beam splitter during a paste-up operation. This beam splitter is a transparent reflective screen which receives an image of the grid transmitted on to its surface from above and superimposes this grid upon the surface of the paste-up sheet. In this way the guide lines of the grid are imposed from above onto the sheet, thus avoiding any light diffusion from the pieces. As the pieces are pasted down, they can be squared up with the grid, thus eliminating the need of any T-squares or triangles without any problem of parallax or without any difficulty of trying to see the guide lines because of the opacity of the individual pieces have been pasted down on top of one another. Because the grid lines are superimposed on the paste-up sheet as a virtual image seen in the transparent reflective screen, the operator's hand working between the transparent reflective screen and the paste-up will not obscure the grid lines during the paste-up operation.

Other objects and advantages will appear in the specification and claims. The drawings illustrate by way of example only preferred embodiments of the invention wherein like numbers designate like parts.

FIGURE 1 is a perspective schematic view of the invention showing the relationship between the grid plate, the transparent reflective screen and the paste-up sheet.

FIGURE 2 is a sectional view taken from the side of a paste-up alignment device.

FIGURE 3 is a view along the lines 3—3 of FIGURE 2 showing the front of the paste-up aligner.

Referring to the drawings and in particular FIGURE 1, there is shown a paste-up sheet 10 on a horizontal supporting member 11. Disposed above this is a transparent reflective screen or beam splitter 12 and above this screen and parallel thereto is a grid plate 13 with a source of light 14 above it. The grid plate 13 is preferably in the form of a negatve; that is, it has clear lines representing the guide lines that are to be transmitted with an opaque or black background. The light source 14 shines through these clear lines transmitting them down on to the screen 12 which is a one-half silvered mirror passing about 30% reflectance and about 40% transmission, the residual being absorbed. Between the grid plate 13 and the light source 14 there is a translucent diffuser 24 similar to milk glass and suitably made of glass or plastic which will distribute the light uniformly over the grid plate. In FIGURE 1 the grid lines shown are being reflected off the screen 12 into the eye 15 of the observer or operator of the paste-up alignment device.

When the screen is positioned equidistant between the grid plate 13 and the paste-up sheet 10, the plate and screen being conveniently made of glass of the same thickness, a virtual image of the grid is obtained which appears to be superimposed in the plane of the paste-up to an operator 15 observing the paste-up through the beam splitter or screen 12. This image of the grid can then be used as a guide for pasting down the pieces during the paste-up operation. The plane of the reflective screen should bisect the included angle formed by the plane of the grid and the plane of the paste-up, being equidistant and parallel to the grid and the paste-up when the latter two are parallel to each other.

In FIGURE 2 there is shown in sectional view a housing 20 for holding the various components of the invention. This housing can be placed on any suitable table 21 or other supporting surface. Horizontal supporting member 11 holding the paste-up sheet 10 may conveniently be a drawing board or the like which is capable of sliding about on the table. The housing 20 supports the screen 12, grid plate 13, the translucent diffuser 24, and provides receptacles 22 for a multiplicity of light sources 14. The transmission of the grid plate will be reflected by the screen at an angle perpendicular thereto. To an observer 15 looking down this line of reflectance, the paste-up sheet will be seen through the screen with the grid superimposed thereon.

The grid plates can be easily interchanged by sliding them into and out of the cabinet or housing 20, thus providing for a multiplicity of different patterns or guide lines for whatever particular copy or layout is desired. The grid plate may be rigid or of a flexible material such as a thin sheet of plastic in which case it would be necessary to support it with a clear piece of glass from underneath. A colored filter can be used to increase the visibility of the grid. A suitable color is amber, the brightness of which can be controlled by means of a voltage control 23 so that an optimum balance between paste-up brightness and grid brightness can be obtained.

The paste-up is pinned or taped to the drawing board 11 which can be slid toward the operator to bring the particular section of the sheet closer to him, thus making it more convenient to work on. By sliding the board it can also be used to check the straightness of a pasted-up line if the same happens to fall between the grid lines. The unit can thus be used to square up, fit, and angle, half tones, reproductions of headlines and body type, cold composition, hot metal type (hot metal paste-up) and engravings to build up complex ads, business forms or page makeup.

It can be conveniently made in any size specified, large enough to accommodate an entire sheet of newspaper or small enough to fit a standard size of letter paper.

The invention has thus provided a new and improved device for producing paste-up copy wherein it has been found that the paste-up operation can be increased in speed by 20% as compared to the pre-printed grid sheets with underlying sources of light and up to 80% faster as compared to the T-square and triangle method.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A paste-up sheet alignment device comprising a paste-up sheet on a horizontal supporting surface, a housing extending upwardly from said support member, a transparent reflective screen in said housing disposed above and in parallel relationship to the paste-up, a grid plate within said housing disposed above and parallel to the screen, said plate having guiding indicia thereon, and means for projecting an image of said indicia onto the screen, the transparent reflective screen reflecting said image and superimposing it along the line of vision of an observer looking at the paste-up sheet through the screen.

2. A device of claim 1, wherein the projecting means is a source of light within said housing disposed above the grid plate.

3. A device of claim 1, wherein the grid plate has transparent guiding lines through which the source of light passes the remainder of its surface being opaque.

4. A device of claim 1, wherein the transparent reflective screen is equidistant from the paste-up sheet and grid plate.

References Cited
UNITED STATES PATENTS

| | | | |
|---|---|---|---|
| 356,144 | 1/1887 | Maxwell | 88—24 |
| 3,007,369 | 11/1961 | Squassoni et al. | |

NORTON ANSHER, *Primary Examiner.*

R. M. SHEER, *Assistant Examiner.*